United States Patent [19]
Figenschou et al.

[11] Patent Number: 6,046,404
[45] Date of Patent: Apr. 4, 2000

[54] SUBSEA CONTROL CABLE

[75] Inventors: Arild Figenschou, Billingstad; Ole A. Heggdal, Finstadjordet, both of Norway

[73] Assignee: Kvaerner Oilfield Products a.s., Oslo, Norway

[21] Appl. No.: 09/057,454

[22] Filed: Apr. 9, 1998

[30] Foreign Application Priority Data

Apr. 29, 1997 [NO] Norway ..................................... 971984
Mar. 16, 1998 [NO] Norway ..................................... 981163

[51] Int. Cl.[7] .............................. F16L 11/12; H01B 7/14; H01B 7/00
[52] U.S. Cl. .................................. 174/47; 174/27; 174/28; 138/111; 138/112
[58] Field of Search .................................. 174/47, 27, 28, 174/113 C, 116; 138/40, 112, 111

[56] References Cited

U.S. PATENT DOCUMENTS

| 3,517,110 | 6/1970 | Morgan ..................... 174/47 |
| 3,526,086 | 9/1970 | Morgan ..................... 174/47 |
| 4,196,307 | 4/1980 | Moore et al. ............... 174/47 |
| 4,765,711 | 8/1988 | Obst ........................ 350/96.23 |
| 5,362,921 | 11/1994 | Birkelund et al. ........... 174/47 |
| 5,902,958 | 5/1999 | Haxton ..................... 174/47 |

FOREIGN PATENT DOCUMENTS

| 1 210 206 | 10/1970 | United Kingdom . |
| 2 002 870 | 2/1979 | United Kingdom . |
| 2 206 144 | 12/1988 | United Kingdom . |
| WO 93/17176 | 9/1993 | WIPO . |

*Primary Examiner*—Kristine Kincaid
*Assistant Examiner*—Mark Olds
*Attorney, Agent, or Firm*—Young & Thompson

[57] ABSTRACT

A subsea control cable includes an outer sheath and cables, conduits etc. arranged inside the sheath, and also at least one weight element. The weight element includes at least one strength member extending continuously along the entire length of the control cable, to which strength member there is attached a weight element or elements. The weight of the weight element in relation to the diameter of the control cable varies along the length of the control cable, e.g., from a predetermined minimum weight/diameter ratio, where the weight element consists only of the strength element, to a predetermined maximum weight/diameter ratio, where the cross-section of the control cable is filled to the maximum with the weight member.

20 Claims, 4 Drawing Sheets

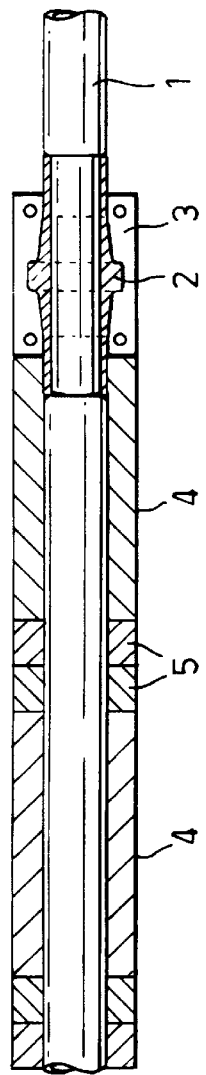
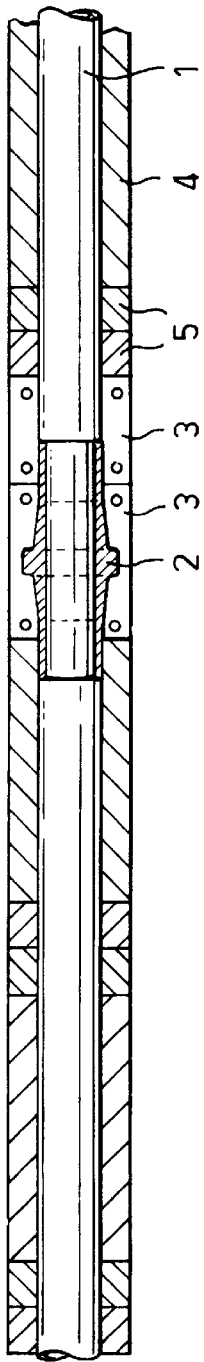
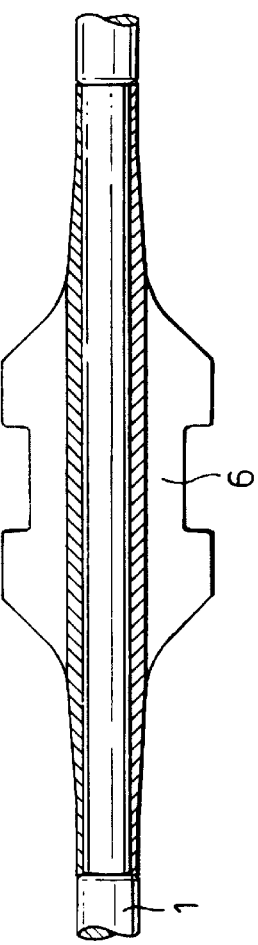
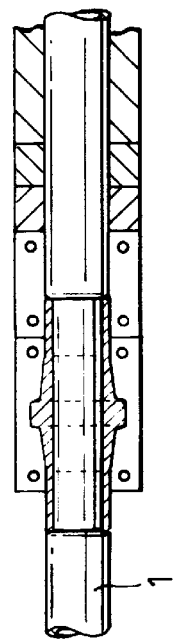

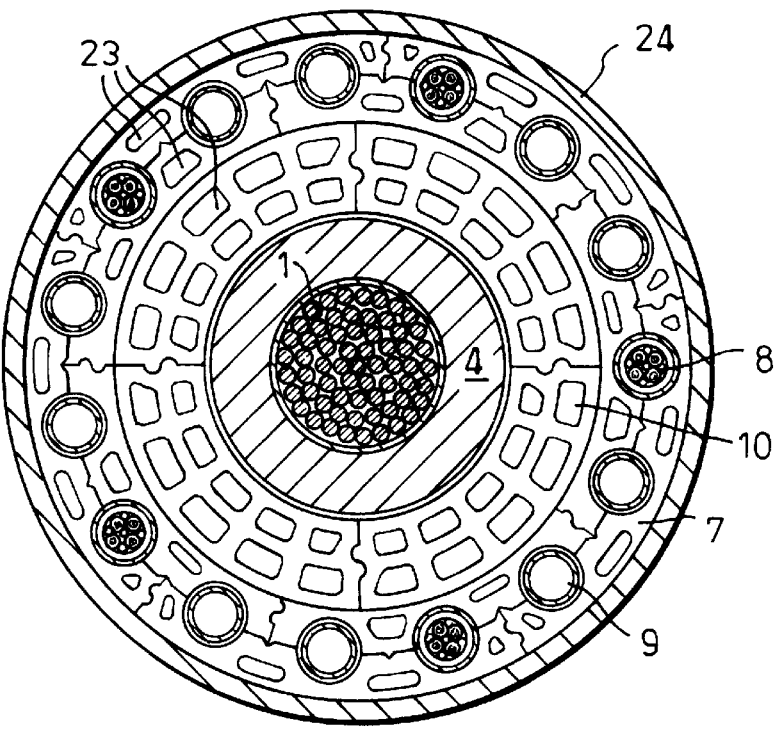
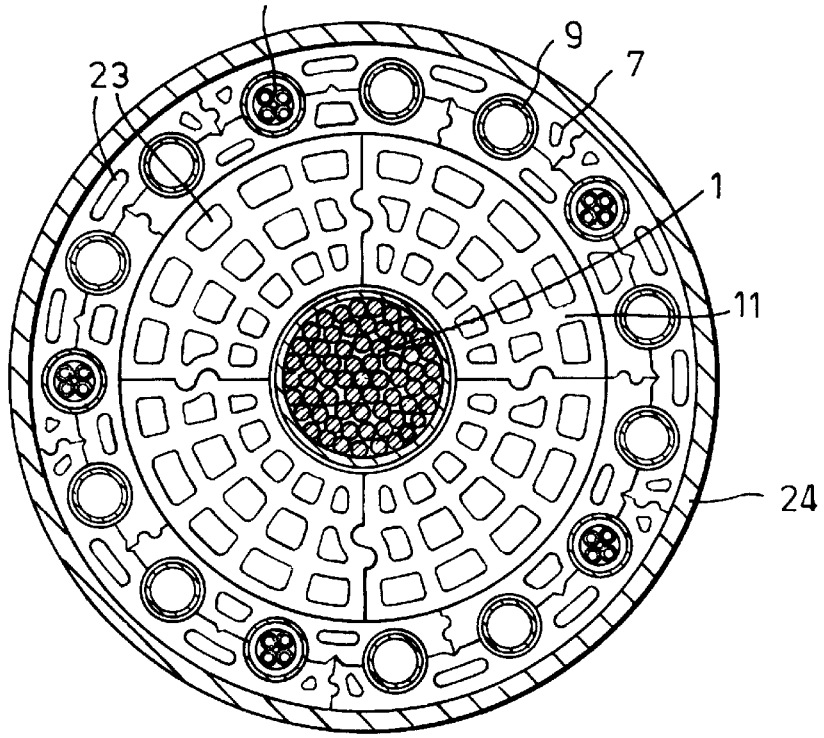

SUBSEA CONTROL CABLE

BACKGROUND OF THE INVENTION

The present invention relates to a subsea control cable, comprising an outer circular-cylindrical sheath and cables, ducts etc. arranged within the sheath, and at least one weight element.

Subsea control cables of this kind, or umbilicals as they are often called, are widely used in offshore oil and gas recovery. The control cable is designed to transport chemicals, hydraulic fluid, electric power and/or electrical control and pilot signals. In particular in those cases where the control cable is designed to extend from a floating structure, for example, a ship, on the sea surface down to a subsea structure on the sea floor, it is essential that the control cable has a particular course, so that relative movements between the ship and the sea floor do not exert excessively large loads on the control cable. To achieve this course, weight elements are hung onto parts of the control cable whilst other parts of the control cable are preferably equipped with floats.

The most common course for the control cable in such a case is a so-called S-shape or wave-shape. In this case, the control cable extends approximately vertically from the ship and then extends in a gentle curve a short distance upwards, in order subsequently to extend in a gentle curve downwards again and finally into an approximately horizontal course at the sea floor. This manner of laying a control cable and the effect this gives are well described in the technical literature, and are well known to persons versed in the art, and will therefore not be described in more detail here.

The attached weight elements and/or floats involve complicated operations when the cable is to be laid, which leads to high costs. Moreover, the result is a number of projecting elements on the surface of the control cable, which may easily become stuck on installations and possibly pulled off

SUMMARY OF THE INVENTION

The object of the present invention is to eliminate or greatly reduce the need for attached weight elements. This is achieved according to the invention in that the weight element comprises at least one strength member which extends continuously along the entire length of the control cable, to which strength element there is attached a weight element/weight elements.

In this way, a situation is achieved where the weight members are integrated inside the cable sheath, whilst they are held in place in connection with the strength member, said strength member being designed to take up tension in the cable.

BRIEF DESCRIPTION OF THE DRAWINGS

The invention will now be described in more detail with reference to the attached drawings, wherein:

FIGS. 1a–1d show a longitudinal section through a part of a control cable according to the invention:

FIGS. 2, 3, 4, and 5 shows a cross-section through a control cable according to the invention with varying weight/diameter ratios for the control cable.

DESCRIPTION OF THE PREFERRED EMBODIMENTS

Figure 2:
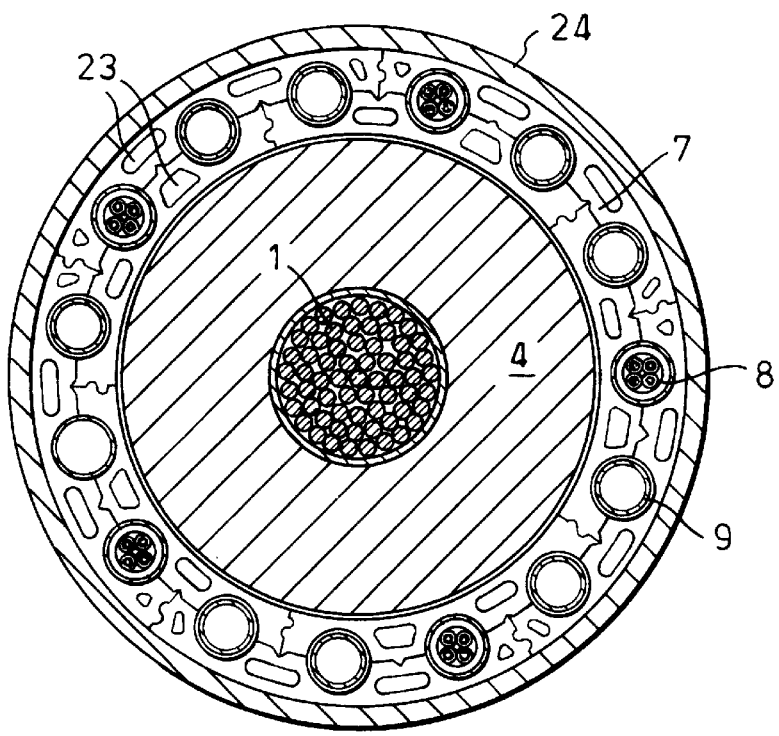

FIGS. 1a–1d show a longitudinal section through a part of a control cable according to the invention, where the right-hand side of FIG. 1b is to be regarded as a continuation of the left-hand side of FIG. 1a, the right-hand side of FIG. 1c is to be regarded as a continuation of the left-hand side of FIG. 1b, and the right-hand side of FIG. 1d is to be regarded as a continuation of the left-hand side of FIG. 1c. The cable according to FIGS. 1a–1d is greatly shortened in relation to reality, since such a control cable is of course several hundred meters in length, and in some case in several thousand meters. The diameter/weight ratio according to FIGS. 1a–1d is therefore greatly exaggerated.

The control cable includes a centrally arranged strength member 1, which extends continuously along the entire length of the cable, broken only by mountings 2, which are integrally connected to the strength member 1, to which mountings 2 there are attached clamps 3. The function of the clamps 3 will be described immediately below. Around the strength members 1 there are arranged weight elements 4, preferably of lead, which may be fixedly connected to the strength member 1, or sit loosely therearound. Between the weight elements 4 there are provided rubber rings 5, which act as shock absorbers between the weight elements 4. The clamps take up the weight from the weight elements 4 and transmit this to the strength member 1, via the mountings 2.

In FIGS. 1a–1d the cables, conduits etc. of the control cable and the sheath are not shown to make the figures easier to understand. However, these components are shown in FIGS. 2–6, and a person versed in the art will easily be able to envisage how these components are arranged in FIGS. 1a–1d.

FIG. 1d shows a larger mounting 6 integrated with the strength member 1, the large mounting 6 being designed to extend through the sheath (not shown) and receive external floats and/or weight elements (not shown) if it should prove necessary to provide these on the outside of the control cable. The mounting 6 may also be used to attach, e.g., an anchor chain or other equipment, to the control cable.

FIGS. 2, 3, 4 and 5 show cross-sections through the control cable with varying weight/diameter ratio, where FIG. 2 shows the largest weight/diameter ratio, whilst FIG. 5 shows the smallest. In FIGS. 2–5 the strength member 1 is arranged centrally in the control cable. The weight elements 4 are arranged around the strength member 1, apart from in the cross-section in FIG. 5, where no weight elements are provided.

Around the outside of the weight element there are provided channel elements 7, preferably of PVC, in which cables 8 and/or fluid conduits 9 are arranged. In FIG. 2 the weight element 4 fills the entire space between the strength member 1 and the channel elements 7. In FIG. 4 spacers 10 are provided between the weight element 4 and the channel elements 7, whilst in FIG. 5 larger spacers 11 are provided which fill the entire space between the strength member 1 and the channel elements 7. The channel elements 7 and/or the spacers 11 may include cavities 23, which can be filled with air, water or another fluid, in order to adjust the buoyancy of the cable. Surrounding all these components there is provided an outer sheath 24 which holds the channel elements 7 in place and protects the cable from the environment.

Figure 3:
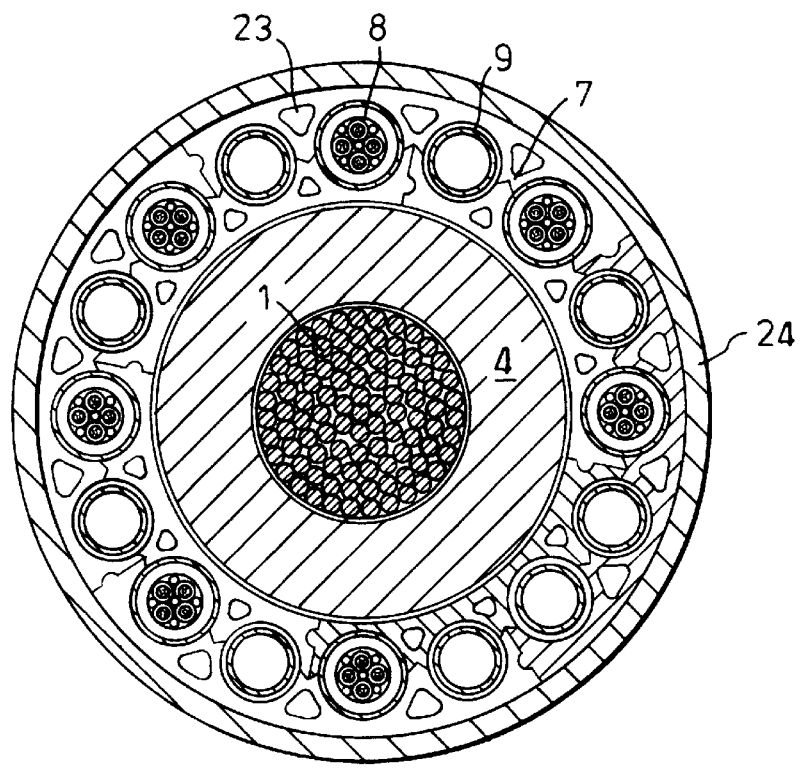

FIG. 3 shows a cross-section through a control cable where the strength member has a somewhat larger diameter than in the cross-sections according to FIGS. 2, 4 and 5. This means that the weight element 4 has a smaller total cross-sectional area.

Here, it should be pointed out that naturally the strength member 1 also adds to the weight of the control cable, in addition to the weight element 4. The strength member 1 can therefore in that respect be seen as a part of the weight element 4. The weight of the control cable in relation to the diameter will vary along the length of the cable from a maximum weight/diameter ratio, represented by the cross-section in FIG. 2 to a minimum weight/diameter ratio, represented by the cross-section in FIG. 5. The strength member 1 may also be tubular and in that case the inner cavity of the strength member can be used for the transport of fluids.

Figure 6:
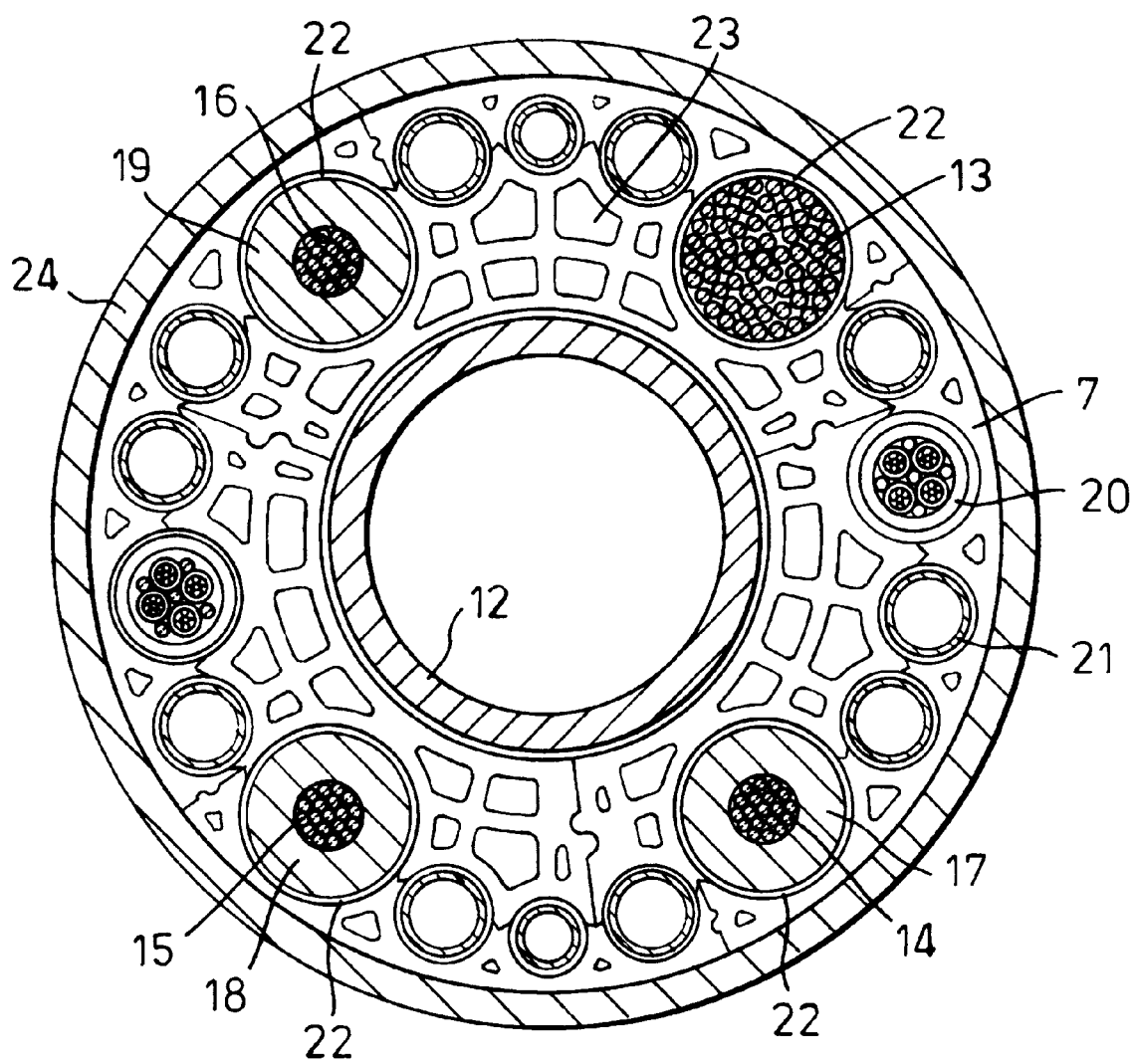
FIG. 6 shows a cross-section through an alternative embodiment of a control cable according to the invention.

FIG. 6 shows an alternative embodiment of the control cable according to the present invention. In this embodiment there is centrally located a conduit 12 for the transport of fluid, such as, for example, chemicals. In this case, the strength member is located outside the center line of the cable in the form of four separate strength members 13, 14, 15 and 16. Around the strength members 14, 15 and 16 there are placed weight elements 17, 18 and 19, whilst the strength member 13 fills the entire cross-section and thus does not include any weight element, but constitutes in itself a weight element. Optionally, the strength member, at least along parts of the length of the control cable, may be made so light that it does not contribute to any great extent to the weight of the control cable. This may, e.g., be appropriate in parts of the control cable where buoyancy is desired.

Around the central conduits there are also arranged electric cables 20 and fluid conduits 21. As in the previous embodiments, these are arranged in channel members 7. In the channel members 7 there are also formed channels 22, in which the strength members/weight elements 13–19 are placed.

Embodiments other than those taught are also conceivable, for example, as mentioned, the strength member can be constructed as a conduit surrounded by weight elements. Furthermore, the weight elements do not need to enclose the strength member completely, but can be arranged around parts of the periphery thereof.

We claim:

1. A subsea control cable, comprising:
   an outer sheath;
   cables and conduits inside said outer sheath;
   a strength member extending continuously along a center axis of an entire length of the control cable and that is a first weight element of the control cable; and
   plural second weight elements coupled to said strength member and carried by said strength member inside said outer sheath.

2. A subsea control cable according to claim 1, wherein said strength member comprises one of a wire, a stay, a conduit of steel, and a conduit of a composite material.

3. A subsea control cable according to claim 1, wherein said second weight elements are arranged continuously around the periphery of said strength member.

4. A subsea control cable according to claim 1, wherein the weight of said second weight elements in relation to the diameter of the control cable varies along the length of the control cable.

5. A subsea control cable according to claim 1, wherein said second weight elements comprise lead, fixedly connected to said strength member.

6. A subsea control cable according to claim 1, wherein said second weight elements are designed to move in relation to said cables and conduits along at least large parts of the length of the control cable.

7. A subsea control cable according to claim 1, wherein said cables and conduits along parts of the length of the control cable or at given points are attached to said second weight element.

8. A subsea control cable according to claim 1, further comprising mounting elements secured to said strength member, said mounting elements extending from said strength member and out through said outer sheath for securing buoyancy elements, additional weight elements, anchoring elements or other equipment.

9. A subsea control cable, comprising:
   an outer sheath;
   cables and conduits inside said outer sheath;
   a plurality of strength members extending continuously along an entire length of the control cable and that are first weight elements of the control cable; and
   plural second weight elements coupled to said strength members and carried by said strength members inside said outer sheath.

10. A subsea control cable according to claim 9, wherein said strength members are arranged symmetrically about a longitudinal axis of the control cable.

11. A subsea control cable according to claim 9, wherein said strength members each comprise one of a wire, a stay, a conduit of steel, and a conduit of composite material.

12. A subsea control cable according to claim 9, wherein said second weight elements are arranged continuously around the periphery of said strength members.

13. A subsea control cable according to claim 9, wherein the weight of said second weight elements in relation to the diameter of the control cable varies along the length of the control cable.

14. A subsea control cable according to claim 9, wherein said second weight elements each comprise lead, which is fixedly connected to said strength members.

15. A subsea control cable according to claim 9, wherein said second weight elements are designed to move in relation to said cables and conduits along at least large parts of the length of the control cable.

16. A subsea control cable according to claim 9, wherein said cables and conduits along parts of the length of the control cable or at given points are attached to said second weight elements.

17. A subsea control cable according to claim 9, further comprising elements secured to said strength members, said mounting elements extending from said strength members and out through said outer sheath for securing buoyancy elements, additional weight elements, anchoring elements and other equipment.

18. A subsea control cable, comprising:
   an outer sheath;
   cables and conduits inside said outer sheath;
   strength means for taking up tension in the control cable, said strength means extending continuously along an entire length of the control cable and being a first weight element of the control cable;
   plural tubular second weight elements that each surround a different longitudinal portion of said strength means inside said outer sheath; and
   plural clamps inside said outer sheath that are attached to said strength means at longitudinally spaced-apart positions for transmitting weights of said second weight elements to said strength means.

19. The cable of claim 18, further comprising a shock absorber separating adjacent longitudinal ends of said second weight elements.

20. The cable of claim 18, wherein said strength means comprises a wire rope.

* * * * *